Dec. 7, 1965    R. W. WARREN    3,221,990
PURE FLUID SHIFT REGISTER

Filed Jan. 30, 1964    2 Sheets-Sheet 1

INVENTOR.
RAYMOND W. WARREN

Dec. 7, 1965 R. W. WARREN 3,221,990
PURE FLUID SHIFT REGISTER
Filed Jan. 30, 1964 2 Sheets-Sheet 2
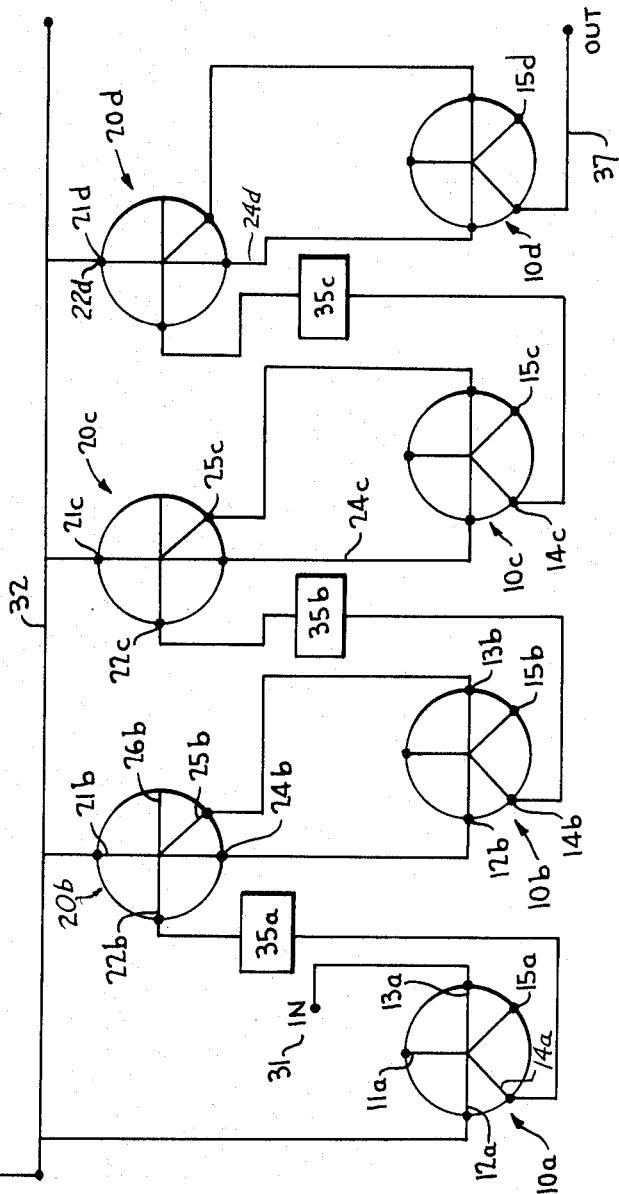
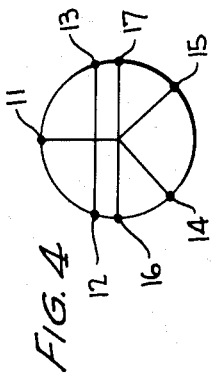
INVENTOR,
RAYMOND W. WARREN
BY: Harry M. Saragovitz,
Edward J. Kelly,
Herbert Berl &
L. I. Marhoefer

United States Patent Office 3,221,990
Patented Dec. 7, 1965

3,221,990
PURE FLUID SHIFT REGISTER
Raymond W. Warren, McLean, Va., assignor to the United States of America as represented by the Secretary of the Army
Filed Jan. 30, 1964, Ser. No. 341,464
5 Claims. (Cl. 235—201)
(Granted under Title 35, U.S. Code (1952), sec. 266)

The invention described herein may be manufactured and used by or for the Government of the United States of America for governmental purposes without the payment to me of any royality thereon.

This ivention relates to data storage, and more particularly to a pure fluid shift register.

Pure fluid logic elements, such as AND units, are described in Patent No. 3,107,850 for "Fluid Logic Components," invented by Raymond W. Warren and Billy M. Horton. With these, and other developments in the fluid art, the foundation has been laid for construction of pure fluid digital computers, control systems, and other information handling and utilization devices of varying complexity. Elemental in any digital system is a shift register, which may perform a variety of functions requiring the storage of data in digital form for utilization at a later time.

One object of this invention is to provide a pure fluid shift registter.

Another object of this invention is to provide a pure fluid shift register which is simple, and employs a minimum of logic elements.

A further object of this invention is to provide a continuous flow, pure fluid shift register, permitting easy access and readout of the register.

The objects of this invention are accomplished through the utilization of a plurality of bi-stable fluid "flip-flops," which serve as information storage units. Information entered into this series of these storage elements is then shifted successively from element to element in the series by means of drive pulses.

The specific nature of the invention, as well as other objects, aspects, uses and advantages thereof, will clearly appear from the following description and from the accompanying drawing, in which:

FIG. 3 is a schematic drawing of the pure fluid shift register of this invention; and FIG. 4 is a schematic drawing of an alternate storage unit which may be employed in the practice of this invention.

Figure 1:
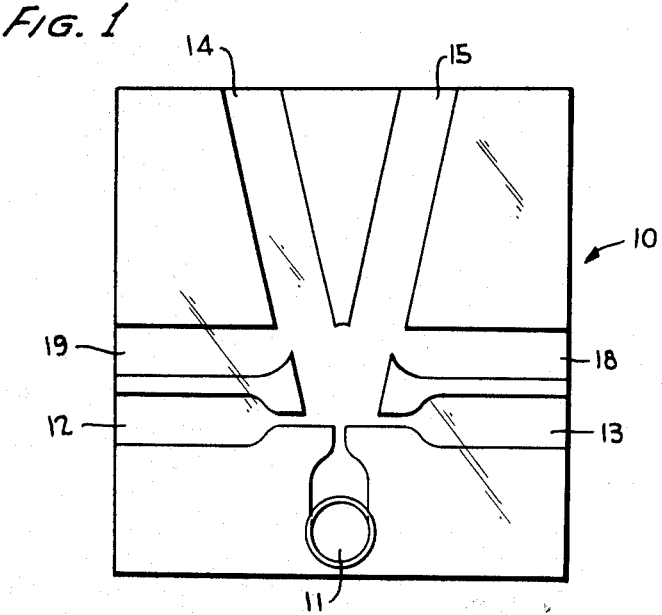
FIG. 1 is a plan view of a pure fluid bi-stable element.

FIG. 1 shows one standard, prior art, bi-stable element employing the principles of boundary layer control to facilitate a quick understanding of the present invention. The bi-stable element includes a power jet input 11, control signal inputs 12 and 13, and fluid signal output channels 14 and 15. Bleeds 18 and 19 may also be used in order to provide some impedance matching. In this invention, one output channel (15) serves as a vent channel and may be used to indicate the state of the unit. A number indicator tab, such as shown in FIG. 10 of Patent No. 3,001,698, may be used to indicate the state if desired.

Figure 2:
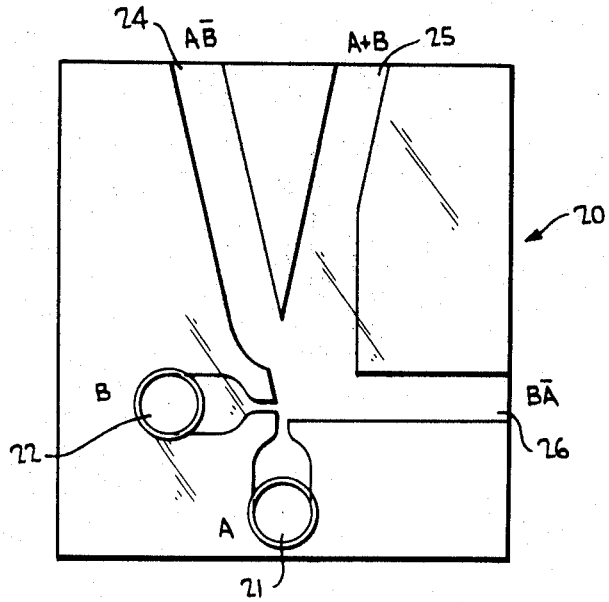
FIG. 2 is a plan view of a pure fluid AND unit, which may be used in the practice of this invention.

One AND element which may be used in the practice of this invention is shown in FIG. 2. This is the same element that is disclosed and claimed in the aforementioned Patent No. 3,107,850. Another AND gate which may be used in the practice of this invention is disclosed in the co-pending application of Raymond Warren, Serial No. 313,402, filed October 2, 1963. The unit shown in FIG. 2 has a power jet input 21, a control signal input 22, and outputs 24, 25, and 26. As can be seen from an inspection of FIG. 2, the right-hand side of the unit has been cut back in the region of the control nozzle in order to prevent the power jet from locking-on the right-hand output channel 25. The power jet is normally locked-on to and issues from, the left-hand channel 24. Denominating the power jet input symbolically as A and the fluid signal control applied at 22 as B, the outputs from 24, 25, and 26 are respectively A not B, A and B, and B not A. That is, with a signal applied at 21, and no signal applied at 22 the fluid jet stream issues from channel 24; in the presence of a signal applied at both 21 and 22, the fluid jet stream issues from channel 25 as long as both signals are present; and with no signal applied at 21 and a signal applied at 22, the fluid jet formed issues from channel 26.

FIG. 3 shows one embodiment of a fluid shift register constructed in accordance with the teachings of this invention. The shift register is comprised of a series of primary storage elements 10, similar to the bi-stable element 10 shown in FIG. 1, and a series of transfer elements 20 similar to the AND element 20 shown in FIG. 2. The same reference numerals have been used in FIG. 3 to designate parts which correspond to FIGS. 1 and 2, with the addition of letter subscripts to denote the separate units.

Four information storage units, $10a$, $10b$, $10c$ and $10d$, are shown in FIG. 3. Information is encoded and stored in these units in the form of the position of the fluid jet. That is, a fluid jet issuing from channel 14 may represent a binary "1" and fluid from channel 15 by a binary "0." Shift register operation results when the binary "1" (in the embodiment of FIG. 3) is shifted from one storage unit 10 to the next for every drive pulse from source 33 applied on line 32.

Connected to control each of the information storage units 10 are transfer control AND units 20. In general, the output 24 of each AND unit 20 is connected to control 12 of an associated storage unit 10, and output 25 is similarly connected to control 13. Input 22 of the transfer control AND unit is from output 14 of the previous storage unit 10 through a storage capacitor 35. Storage capacitor 35, when compressible fluids are used, may be merely a fixed volume tank. If incompressible fluids are used a diaphragm tank may be used. The function to the tank is to provide an RC time delay, and for this reason it may also be necessary to add some fluid resistance to the line, which may readily be done with a nozzle in the line. In many applications the provision of a discrete capacitor 35 will be unnecessary, the connecting lines providing enough capacitance. The second input 21 to the AND gate 20 is from drive pulse supply line 32. The function of transfer control units 20 is to insure that the binary "1" is transferred to the succeeding unit 10 only in response to a drive pulse, and further to insure that the binary "1" remains stored in that unit until the next drive pulse. Also, the AND units 20 help to provide some impedance matching between stages.

The operation of the shift register shown in FIG. 3 is as follows. Initially, assume that all the bi-stable storage units 10 are in the state where the fluid jet is issuing from the vent channel 15-binary "0." There are several ways to bias the units to insure that all the bi-stable storage units 10 start in the "0" position, with flow issuing from the channel 15. One is to round the edge of the nozzle slightly in the direction it is desired to have the stream start. Another is to incline the nozzle slightly in the desired direction. And another is to move one boundary wall closer to the nozzle than the other.

A fluid pulse applied at 31 to the right-hand channel $13a$ of the first storage unit $10a$ shifts the power jet to its second stable state, where it issues from the left-hand channel 14a—binary "1." This output from 14a is applied to the input 22b of the transfer control AND unit 20b. In the absence of a drive pulse on line 32, the continuous input to 22b issues from 26b, and there is no appreciable output from the channels 24b or 25b.

A synchronizing or drive pulse on line 32 is applied simultaneously to inputs 21b, 21c, 21d, and also the left-hand control 12a of storage unit 10a. The pulse applied at 12a switches the unit back to the "0" state with the power jet issuing from 15a. While 10a is switching, because of the time delay provided by capacitor 35a, there are concurrent inputs to 22b and 21b of the AND unit 20b producing an output at 25b. The output from 25b applied to the right-hand control of bi-stable storage unit 10b causes this unit to switch from an output from 15b —binary "0"—to an output from 14b—binary "1." This output from 14b is applied to the subsequent temporary storage unit 20c, but by this time the short duration drive pulse has ended, and the next unit 10c is not switched. The drive pulse applied to 21c and 21d, in the absence of a signal at 22c and 22d, issues from 24c and 24d, merely maintaining the connected storage units 10c and 10d in their "0" state.

With the "1" state shifted from 10a to 10b, 10b remains in the "1" state until the next drive pulse. This next drive pulse is applied substantially simultaneously to the temporary storage units 20b, c, d, etc. This pulse, applied to 21b in the absence of an input to 22b, issues from 24b and switches the controlled unit 10b from the left-hand output 14b to the right-hand output 15b. The concurrent input to 22c and 21c of unit 20c produces an output at 25c which switches the succeeding storage 10c to its "1" position, with the power jet issuing from channel 14c. In this manner the "1" has been transferred from the storage unit 10b to storage unit 10c.

The subsequent operation of the shift register of this invention is merely a repetition of the operation thus far described. In the illustrative embodiment shown, an output is taken from the last storage unit 10d at 37. Obviously, as many storage units as desired may be employed, and the output may be used for any of a number of purposes which are common in the art. For example, the output at 37 may be coupled to the input at 31 and the pulse continuously circulated to perform a clock pulse or delay function.

Provision may be made to clear the shift register if desired. This may be done by adding an additional control nozzle 16 to the storage units 10 as shown schematically in FIG. 4. This additional input 16 is also another way to cause the power jet to issue initially from the right-hand channel 15.

Further, when desired, an additional control 17 may also be provided, as is shown schematically in FIG. 4. With controls 16 and 17, any number desired may be preset into the register, by applying an appropriate control signal. By admitting a discrete synchronizing pulse from 33 the entire number, preset into the register, can be shifted by one bi-stable element. In the binary system this is the equivalent of dividing by two or multiplying by two. Of course, if the bi-stable element such as is shown in FIG. 4 is used, it is also possible to shift right to left as well as from left to right by providing an additional set of AND units and synchronizing pulses to the controls 16 and 17.

There must be impedance matching between the various elements which comprise the shift register shown in FIG. 3. That is, the output from the storage units 10 will normally be too high in pressure and volume to serve as an input for AND units 20. However, as is common in the art, impedance matching may be accomplished by means of bleeds which are disclosed and taught in the co-pending application of Raymond W. Warren, Serial No. 281,847, filed May 20, 1963.

It will be apparent that the embodiments shown are only exemplary and that various modifications can be made in construction and arrangement within the scope of the appended claims.

I claim as my invention:

1. A pure fluid shift register comprising:
 (a) a source of fluid synchronizing pulses;
 (b) a plurality of successive pure fluid bistable information storage elements connected to a fluid power source;
 (c) a plurality of pure fluid AND gates;
 (d) each of said AND gates being connected between a preceding and a succeeding bistable element;
 (e) an input of a first one of said bistable elements and an input of each of said AND gates being connected to said source of fluid pulses;
 (f) the output of each of said bistable elements indicating one stable state thereof being connected thru an RC time delay to the other input of each of said AND gates;
 (g) said succeeding bistable elements being switched to one stable state in response to said AND gates receiving only a synchronizing fluid pulse;
 (h) said succeeding bistable elements being switched to the other stable state in response to said AND gates receiving a synchronizing fluid pulse simultaneously with a delayed fluid signal produced by a preceding bistable element; whereby
 (i) the state of a preceding bistable element is transferred to a succeeding bistable element with each synchronizing fluid pulse.

2. The shift register according to claim 1 wherein said bistable elements are biased to one stable state.

3. The shift register according to claim 2 wherein said register includes means to preset said register to a desired condition.

4. A pure fluid shift register comprising:
 (a) a source of fluid synchronizing pulses;
 (b) a plurality of successive pure fluid information storage units;
 (c) each of said storage units being a bistable element having a power jet input connected to a fluid power source, a pair of control inputs, an output channel indicating a first stable state, and an output channel indicating a second stable state;
 (d) the power jet of each of said bistable elements being biased to flow in said output channel indicating said first stable state;
 (e) a plurality of pure fluid transfer elements;
 (f) each of said transfer elements being connected between a preceding storage unit and a succeeding storage unit;
 (g) each of said transfer elements being an AND gate having first and second input channels and first and second output channels;
 (h) said AND gates being constructed to produce signals in said first output channels when signals are received only in said first input channels and to produce signals in said second output channels when signals are received simultaneously in said first and second input channels;
 (i) one of said control inputs of a first one of said bistable elements and said first input channel of each of said AND gates being connected to said source of fluid pulses;
 (j) said output channels of said bistable elements indicating said second stable state being connected thru RC time delays to said second input channels of said AND gates;
 (k) said first and second output channels of said AND gates being connected to said control inputs of said bistable elements;
 (l) said power jet of said first one of said bistable elements being switched to flow in said output channel indicating said second stable state of said first bistable element in response to a fluid signal presented to the other of said control inputs of said first bistable element;

(m) said power jet of a succeeding bistable element being switched to flow in said output channel indicating said second stable state of said succeeding element in response to the fluid signal produced in said second output channel of the AND gate connected between said preceding and succeeding elements;

(n) said fluid signal being produced in said second output channel of said AND gate in response to the first input channel of said AND gate receiving a fluid pulse from said source of fluid pulses simultaneously with the second input channel of said AND gate receiving the delayed signal from said output channel indicating said second stable state of said first bistable element; and (o) said power jet of said first bistable element being switched back to flow in said output channel indicating said first stable state by said fluid pulse; whereby (p) the state of each of said preceding bistable elements is transferred to each of said succeeding bistable elements with each fluid pulse from said source of fluid pulses.

5. The pure fluid shift register according to claim 4 wherein said bistable elements include additional control input means for controlling the flow of said power jets between said output channels indicating said stable states of said elements, whereby said register may be preset to any desired condition.

References Cited by the Examiner

UNITED STATES PATENTS

| | | | |
|---|---|---|---|
| 3,001,698 | 9/1961 | Warren | 235—201 |
| 3,093,306 | 6/1963 | Warren | 235—201 |
| 3,128,039 | 4/1964 | Norwood | 235—201 |
| 3,128,040 | 4/1964 | Norwood | 235—201 |

OTHER REFERENCES

Dexter: "Technique for Matching Pure Fluid Components Applied to the Design of a Shift Register," Fluid Amplification Symposium, Diamond Ordnance Fuze Laboratories, Washington, 1962. Pages 449–453.

Mitchell: "Fluid Binary Counter," IBM Technical Disclosure, page 30, vol. 6, No. 2, July 1963.

Mitchell: "Fluid Matrix," IBM Technical Disclosure, page 31, vol. 6, No. 2, July 1963.

Mitchell et al.: "Self-Locking Fluid Sensing Station," IBM Technical Disclosure, page 31, vol. 6, No. 3, August 1963.

Shinn: "No Moving Parts Needed!" SAE Journal, pages 38–43, August 1963.

Wood and Fox: "Fluid Computers," International Science and Technology, pages 44–52, No. 23, November 1963.

LEO SMILOW, *Primary Examiner.*